United States Patent [19]
Bradley et al.

[11] 3,785,420
[45] Jan. 15, 1974

[54] RIVET AND SETTING TOOL THEREFOR

[76] Inventors: Robert H. Bradley, Rt. No. 2, Box 333, Long Lake, Minn. 55356; William O. Bradley, 6312 Loch Moor Dr., Edina, Minn. 55435

[22] Filed: May 26, 1972

[21] Appl. No.: 257,285

[52] U.S. Cl. .......................... 151/37, 85/9, 151/31
[51] Int. Cl. .......................................... F16b 39/282
[58] Field of Search ............... 151/31, 37; 85/9 R

[56] References Cited
UNITED STATES PATENTS

| | | | |
|---|---|---|---|
| 1,894,708 | 1/1933 | Sardeson | 85/9 R |
| 1,830,554 | 11/1931 | McMullin | 85/9 R |
| 378,857 | 2/1888 | Woodford | 85/9 R |
| 2,982,166 | 5/1961 | Hobbs | 85/9 R |
| 3,283,638 | 11/1966 | Ansingh | 85/9 R |
| 2,292,239 | 8/1942 | Pierce et al. | 151/37 |

FOREIGN PATENTS OR APPLICATIONS

| | | | |
|---|---|---|---|
| 17,005 | 3/1885 | Great Britain | 151/31 |
| 334,413 | 1/1959 | Switzerland | 151/31 |

*Primary Examiner*—Edward C. Allen
*Attorney*—Ralph F. Merchant et al.

[57] ABSTRACT

A solid metallic rivet including a diametrically enlarged head and a screw threaded shank for reception of a nut, the head defining a generally flat annular shoulder having portions projecting axially from the shoulder. The shank has an outer end provided with a recess to aid in upsetting the outer end of the shank to strengthen the bond between the shank and nut and to prevent loosening of the nut.

1 Claim, 5 Drawing Figures

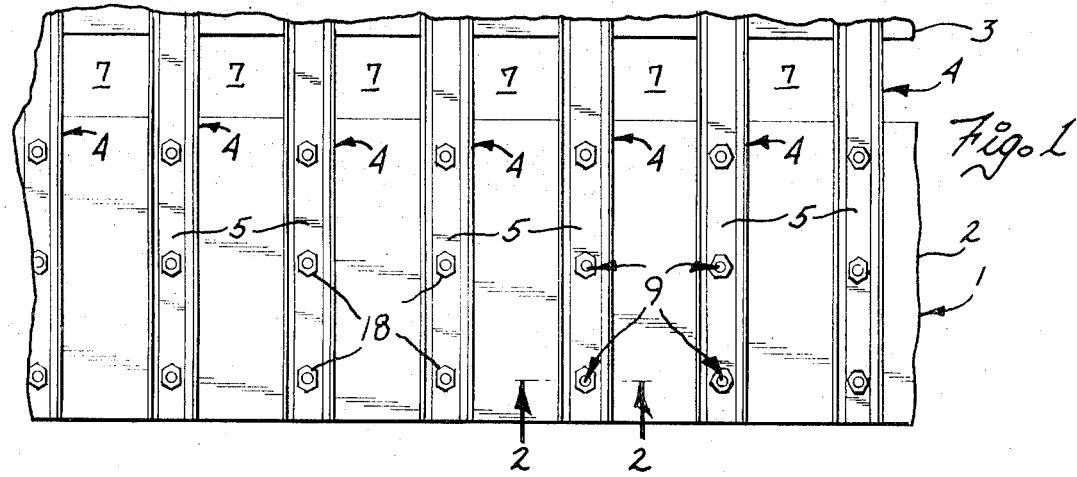
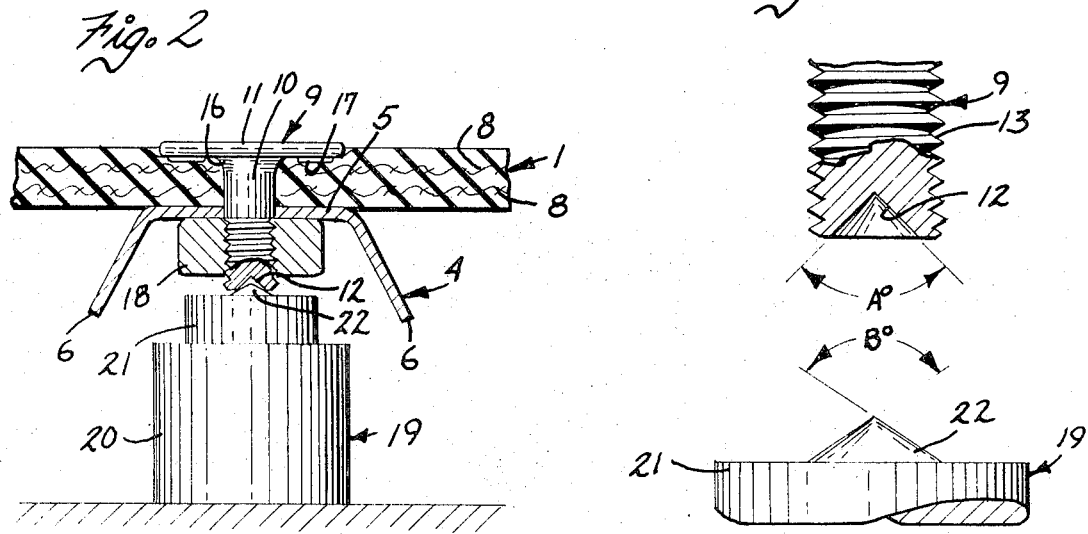
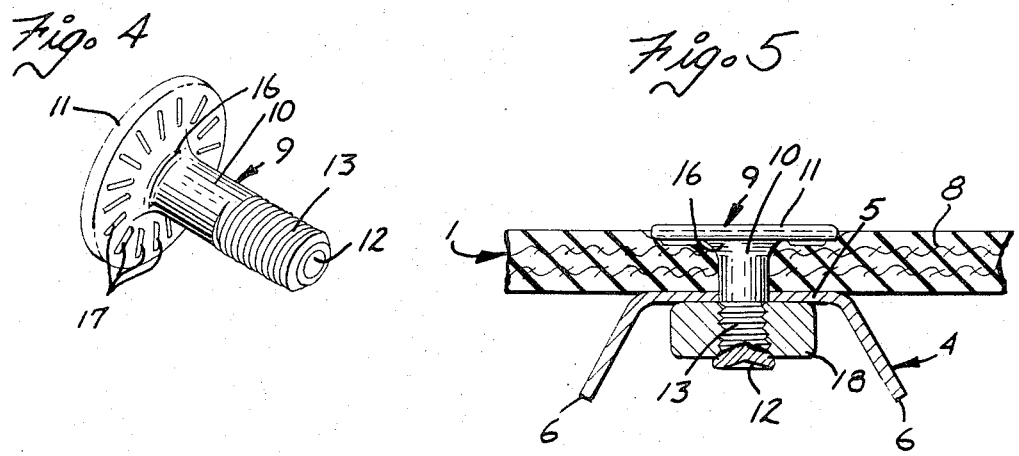

RIVET AND SETTING TOOL THEREFOR

BACKGROUND OF THE INVENTION

Endless flexible drive tracks or belts, of the type commonly used in propelling vehicles over snow or ice, are usually provided with metallic snow or ice engaging cleats or studs, many such drive tracks also utilizing guide members for sliding engagement with slide rails and with drive sprocket wheels. In many instances these cleats, studs and guide members are fastened to the flexible non-metallic drive tracks with tubular or so-called blind rivets. Otherwise, nut equipped bolts are sometimes used. It has been found that tubular or blind rivets often lack the strength necessary to properly hold cleats, studs and the like on drive tracks during hard usage, and the nut-equipped screws or bolts often work loose under the constant vibrations of a drive track or belt during hard use. It has been further found that, in many instances, rivet and bolt heads have sharp edges which cut into the fabric or material of the drive belt and effectively shorten the useful life of these devices.

SUMMARY OF THE INVENTION

An important object of this invention is the provision of a rivet which will not work loose during heavy and extended use of a cleat or stud equipped belt to which it is applied.

Another object of this invention is the provision of a rivet which will not cut or otherwise injure flexible belt material.

Still another object of this invention is the provision of a rivet which can be easily applied to an endless drive belt and which is adapted to hold a metallic cleat, stud or other object on the belt with optimum holding pressure.

Another object of this invention is the provision of a rivet which may be applied to the drive belt without the necessity of sophisticated riveting equipment.

To these ends, we provide a rivet including a screw threaded shank having a diametrically enlarged head at one end and an axially outwardly opening conical recess at its opposite or free end. The threads extend from said free end and terminate in axially spaced relation to the enlarged head, and an anchoring nut is screw threaded on the shank. The head is formed to provide a substantially flat annular shoulder having a plurality of circumferentially spaced axially projecting radial ridges thereon for engagement with the adjacent surface of the drive belt to prevent rotation of the rivet with respect to the belt. The peripheral edge of the head is convexedly curved between the shoulder and the axially outer end of the head to prevent cutting of the belt material by the head when the anchoring nut is tightened on the shank. A setting tool is formed to provide a conical point receivable in the shank recess, the recess having diametrically opposed portions defining an angle of a predetermined circular degree measurement, the point having diametrically opposed side portions defining an angle having a substantially greater circular degree measurement than that of the recess, so that the point will tend to radially and circumferentially spread the outer or free end of the shank when axial pressure is exerted on the shank by the tool.

DESCRIPTION OF THE DRAWINGS

FIG. 1 is a fragmentary view in plan of a conventional snowmobile drive track with cleats thereof being anchored to belt sections by rivets produced in accordance with this invention;

FIG. 2 is a greatly enlarged fragmentary section taken substantially on the line 2—2 of FIG. 1 and showing the setting tool of this invention applied to the rivet thereof;

FIG. 3 is a further enlarged fragmentary detail corresponding to a portion of FIG. 2, the parts thereof being shown in separated relationship;

FIG. 4 is a view in perspective of the rivet of this invention; and

FIG. 5 is a view corresponding substantially to FIG. 2 but showing the rivet after having the free end thereof upset by the upsetting tool.

DETAILED DESCRIPTION OF THE PREFERRED EMBODIMENT

In FIG. 1, a snowmobile drive track or belt is indicated generally at 1, the same comprising a pair of laterally spaced endless drive belt sections 2 and 3 held in laterally spaced apart parallel relationship by transverse snow cleats or the like 4. The cleats 4 are generally channel shaped, having longitudinally extending flat intermediate portions 5 and laterally spaced longitudinal side flanges 6 which, for the purpose of the present example, are shown as being disposed in outwardly diverging relationship. The belt sections 2 and 3, with the several longitudinally spaced transverse cleats 4 cooperate to define longitudinally spaced openings 7 for reception of the teeth of drive and idler sprocket wheels usually associated with vehicles such as snowmobiles. Also, as shown in FIGS. 2 and 5, the belt sections are preferably made from rubber or similar flexible material having one or more layers of woven fabric embedded therein, the fabric being indicated at 8.

The rivet of this invention is intended for use as original equipment to hold the belt sections 2 and 3 and cleats 5 together, or as replacement parts, to repair drive tracks wherein the rivets have failed and separation of the belt sections and cleats occurs. The rivet of this invention is indicated in its entirety by the reference numeral 9, and comprises an axially extended shank 10, and a diametrically enlarged flat-topped head 11. At its outer or free end, the shank 10 is provided with an axially outwardly opening conical recess 12, and is screw threaded, as indicated at 13 from the free end, the screw thread 13 terminating in axially spaced relation to the head 11. As shown in FIG. 3, diametrically opposite sides of the recess 12 define an angle indicated at A circular degrees. This angle may be of any desired angular measurement but, for the purpose of the present example, is 90 degrees.

The head 11 of the rivet 9 has a peripheral edge 14 and a generally flat annular shoulder 15, the shoulder 15 having a radially inner curved fillet portion 16 merging with the adjacent end of the shank 10. The annular shoulder 15 defines a plurality of circumferentially spaced axially outwardly projecting radial ridges 17, the peripheral edge 14 defining a convex curve between the generally flat top of the head 11 and the shoulder 15. As shown, each rivet 9 is provided with an anchoring nut 18.

The setting tool of this invention is indicated in its entirety by the numeral 19, and comprises a base portion 20 that is adapted to rest upon any suitable support surface, a diametrically reduced body portion 21, and a conical point 22 projecting axially from the body portion 21 and receivable in the conical recess 12 of one of the rivets 9. Diametrically opposite side portions of the point 22 define an angle having a predetermined number of circular degrees, the angle being indicated in FIG. 3 at B degrees. Preferably, the angle B has a greater circular degree measurement than the angle A. For the purpose of the present example the angle B may be assumed to be 100 circular degrees.

It will be appreciated that the rivet of this invention may be made in several sizes in accordance with the diameters of holes in drive tracks, cleats, studs and other appurtenances which are applied so such drive tracks. In assembling a cleat 4 to a belt section such as the section 2, a rivet 9 is inserted in aligned openings in the belt section 2 and cleat 4, and a nut 18 screw threaded on the threaded portion 13 of the rivet 9. As shown in FIG. 2, the nut 18 is screw threaded to the extent that the adjacent portion of the drive track section 2 is somewhat compressed between the rivet head shoulder 15 and the flat intermediate portion 5 of the cleat 4, with the radial ridges 17 becoming embedded in the material of the drive belt. The fillet portion 16 further tends to compress the belt material immediately adjacent thereto so that the shank 10 is tightly engaged by the belt material. Preferably, the anchoring nuts 18 are tightened to a point where the flat tops of the rivet heads 11 project slightly above the plane of the adjacent belt surface, as shown in FIGS. 2 and 5. As each nut 18 is tightened, engagement of the belt section 2 by the radial ridges 17 securely holds each rivet 9 against rotation with respect to the belt section 2 upon further tightening of each nut 18.

After the nuts 18 are properly tightened on their respective rivet shanks 10, each rivet 9 is disposed on the setting tool 19 so that the conical point 22 is received within the recess 12 of each rivet 9, as shown in FIG. 2. A hammer or other suitable tool, not shown, is then used to strike the head 11 of the rivet 9, so as to cause the setting tool point 22 to upset the adjacent end of the rivet shank 10, as shown in FIG. 5, to positively hold each anchoring nut 18 against rotation in a nut loosening direction. If desired, the belt, cleat and rivet assembly may be inverted and the rivet head 11 placed on a solid base of support. The setting tool may be then inverted from its position of FIG. 2, properly fitted to the rivet and struck with a hammer or other tool to upset or clinch the rivet end over the nut 18.

The convex curvature of the peripheral edge 14 of each rivet head 11 provides for a relatively smooth belt engaging surface which does not cut or tear into the material of the underlying belt section 2 or 3 even under the most strenuous use and strain applied thereto. Further, not only does the fillet portion 16 of each rivet tend to securely hold the rivet shank 10 in its respective opening through the adjacent belt section, but it also adds considerable strength to the rivet as a whole. Each nut 18 serves as a base for riveting and prevents swelling of the shank of its respective rivet in the unsupported area between the rivet head and its respective cleat 4.

When it is desired to remove a rivet 9 and its respective nut from the assembly, the recess 12 serves as a center mark for a drill bit or similar tool, usually adapted for removal purposes.

While the axial projections 17 are shown as being in the nature of radial ridges, the same may be of various other designs capable of holding the rivet against rotation relative to the belt sections 2 or 3.

While we have shown and described a commercial embodiment of our novel rivet and setting tool therefor, it will be understood that the same is capable of modification without departure from the spirit and scope of the invention, as defined in the claims.

What is claimed is:

1. A solid rivet for securing a relatively hard piece to a relatively softer non-metallic flexible and compressible member, said rivet comprising a solid shank and a diametrically enlarged head having a generally flat axially outer surface, a generally flat annular shoulder, and a cross-sectionally convex circular outer edge surface connecting said axially outer surface and said shoulder; said rivet further including a rounded annular fillet portion between said shank and said shoulder; said shoulder having a plurality of axially projecting radial ridges, said ridges having radially inner ends disposed in radially outwardly spaced relation to said fillet portion and outer ends disposed radially inwardly from said edge surface; said shank having a screw threaded outer end portion for reception of a nut; said outer end portion defining a longitudinally outwardly opening axial recess facilitating upsetting of the outer end over the nut when the nut is screw threaded on the same; said axially projecting radial ridges becoming embedded in said member responsive to screw threading of said nut on the shank to hold said rivet against rotation in said member.

* * * * *